UNITED STATES PATENT OFFICE.

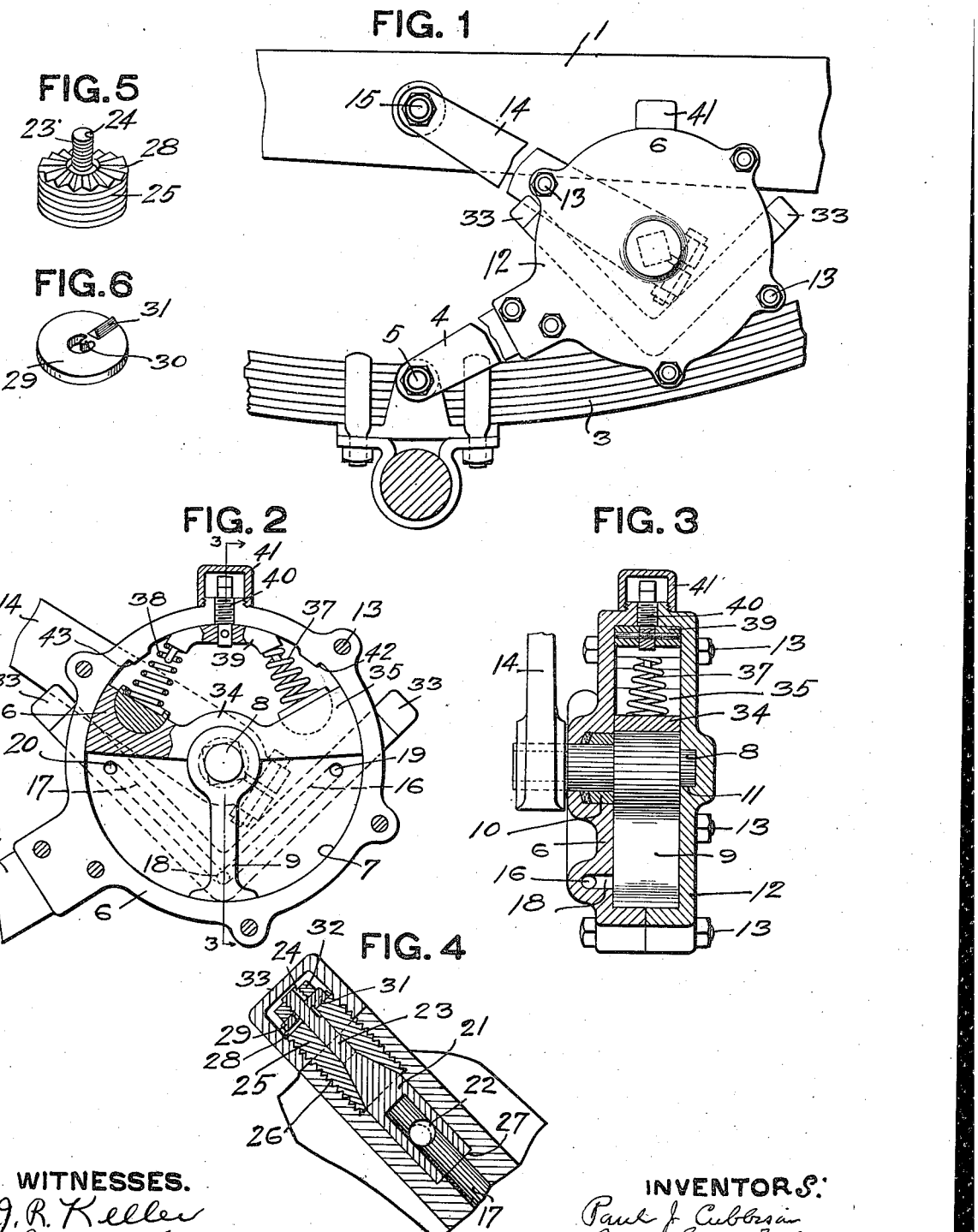

PAUL J. CUBBISON AND ROBERT G. McFARLAND, OF NEW CASTLE, PENNSYLVANIA.

SHOCK-ABSORBER.

1,171,096. Specification of Letters Patent. Patented Feb. 8, 1916.

Original application filed August 15, 1911, Serial No. 644,150. Divided and this application filed May 16, 1913. Serial No. 768,077.

*To all whom it may concern:*

Be it known that we, PAUL J. CUBBISON and ROBERT G. McFARLAND, citizens of the United States, and residents of New Castle, in the county of Lawrence and State of Pennsylvania, have invented a new and useful Improvement in Shock-Absorbers; and we do hereby declare the following to be a full, clear, and exact description thereof.

Our invention relates to improvements in shock absorbers for vehicles and is of the same general character as that described and claimed in our Patent No. 1,066,255, dated July 1, 1913, of which this application is a division.

The object of our invention will be best exemplified by a brief statement of the conditions which the ideal shock absorber is designed to meet, and which conditions present the problem which this invention is intended to solve.

When the axle of the vehicle receives a heavy impact from an obstruction in the road, it is desirable that the ordinary spring of the vehicle be free to take and absorb to a considerable extent the initial force of this impact without interference by the shock absorber. As the spring approaches the limit of compression movement of the blow the co-acting influence of the absorber should then be brought into action to reinforce the spring and resist further compression beyond the safety limit or aid the spring in opposing the final compression force. Again as the spring tends to expand to normal position on the rebound of the vehicle body, it should again be more or less free at the start of its expansion movement, but the shock absorber should again aid the spring in preventing it from expanding too far beyond its normal condition under a static load. Furthermore, in case one wheel of the vehicle drops into a deep rut, it is necessary that the spring should be free at the beginning of such movement to exert its normal function of first permitting this movement without great resistance and finally absorbing or resisting the movement. In such expansion movement also the shock absorber must not impede the spring during such initial movement, but should reinforce it in resisting excessive movement and here again the absorber should permit more or less free return of the spring from such excessively expanded position to its normal position under a static load. Finally, the shock absorber should offer little or no resistance to the action of the spring under moderate blows on the axle due to comparatively small inequalities in the roadway. In other words, under these conditions the vehicle spring should be comparatively free to perform its normal function of compensating for slight jars on the axle. Briefly, therefore, the requirements of shock absorbers in practice are, first, that they shall have little or no effect on small oscillations; second, that their action shall be progressive, restraining a large deflection more energetically than a smaller one; and third, that their action shall be of short duration, so as to place the vehicle spring in its position of equilibrium with the static load as quickly as possible ready to receive a new shock, if one should arise.

With these objects in view our invention consists in a construction and arrangement of parts and a mode of operation which is illustrated in the accompanying drawings, in which—

Figure 1 is a side elevation of the shock absorber in place on the vehicle; Fig. 2 is a similar view of the interior mechanism, the cover plate being removed for clear illustration; Fig. 3 is a sectional view on the line 3—3 Fig. 2; Fig. 4 is a sectional detail of the by-pass adjustment of the absorber, and Figs. 5 and 6 are perspective views of details of this adjusting mechanism.

In the preferred embodiment of the invention here illustrated, 1 indicates a part of the vehicle frame, 2 the axle and 3 the spring suitably secured thereto. The shock absorber comprises an arm 4 pivoted to the spring clip at 5 and rigid with the body portion 6 of the absorber. In this case the absorber includes a cylindrical chamber 7 which is to be filled with some suitable substantially non-compressible fluid such as oil. Centrally mounted on a shaft 8 is a piston compression blade 9. The shaft 8 is suitably journaled in a bearing 10 in the body portion and in a bearing 11 in the cover plate 12 of the device, the body portion and cover plate being secured together by the bolts 13. Upon the shaft 8 also is rigidly mounted the arm 14 which is pivoted to the vehicle frame at 15. The body portion is also provided with by-pass passages 16 and 17 which may be suitably cast therein as illustrated in Fig. 3 and which meet in a port 18 communicating with the interior of the chamber 7 opposite the normal position or position under static load of the piston blade 9, the extremities of these passages communicating with the chamber 7 of the body portion 6 by ports 19 and 20 respectively upon opposite sides of the piston blade 9. As indicated in Fig. 4, each of these ports 19 and 20 may be provided with a regulating valve consisting of a valve plug 21 having a port 22 adapted to communicate with the port 19 or 20, as the case may be, the plug having a stem 23 provided at its end with a key-way 24, a screw plug 25 screwed into a threaded enlargement 26 in the casing after the valve plug 21 is inserted in its seat 27, and said screw plug has at its outer end a series of serrations 28. A washer 29 is provided having a key 30 adapted to seat within the key-way 24 of the valve plug stem 23 and having a wedge shaped lug or key 31 adapted to engage the serrations 28 of the screw plug 25. A jam nut 32 is provided for the outer end of the valve plug stem 23 and when tightened acts to hold the said stem and hence the valve plug 21 in adjusted position. A hollow cap 33 is also screwed onto the threaded plug 28 and serves to protect the valve parts. In order to change the degree of opening of the port 20 it is only necessary to remove the cap 33 and loosen the jam nut 32 whereupon the valve plug 21 may be turned until the proper degree of opening or closure of the part 20 or 19, as the case may be, is attained. The washer 29 is then replaced with its lug or key 31 engaging the serrations of the screw plug 25. The jam nut is then screwed down and the protecting cap replaced.

Mounted revolubly on the stem axis of the piston blade 9, within the chamber 7 of the absorber, is a checking member 34 having wings 35 and 36 respectively, which form the limiting walls of the piston chamber within which the piston blade acts. This checking member is held normally substantially at right angles to the piston blade by means of compression springs 37 and 38, the tension of which springs may be regulated by adjustment of their common abutting block 39 by means of an adjusting screw key 40 threaded into the casing and protected by a suitable cap 41. From the above description and inspection of Fig. 2 it will be seen that the piston blade 9 divides the chamber 7 limited by the checking member 34 into two equal parts when said piston blade is in normal position under static load and also when the piston is in this position it closes the port 18 of the passages 16 and 17, thus limiting any by-pass action of these passages 16 and 17 to and through the ports 19 and 20. The pressure of the checking member springs 37 and 38 upon the checking member 34 is comparatively light, but is sufficient to resist slightly any movement of the piston blade 9 (through the medium of the compression fluid within the chamber 7). This resistance, however, is in a measure counteracted by the by-pass of the compression fluid through the passages 16 and 17. To check excessive movement of the checking member 34, the interior of the casing 6 is provided with the stop shoulders 42, 43, for the purpose hereinafter described.

Under very slight impacts on the axle of the vehicle, the checking member springs 37 and 38 will yield somewhat permitting the piston blade, the checking member and the intermediate fluid to move substantially as a unit whereby these slight impacts are taken up comparatively freely by the springs of the vehicle so that the vehicle springs are permitted to perform their normal function of relieving the vehicle body from the jarring effect of these slight impacts. Also the by-pass passages 16 and 17 aid in this free movement by allowing for the escape of a limited amount of the compression fluid from one side of the piston 9 to the other to compensate in some degree for the resistance offered by the resistance springs 37 and 38 to movement of the checking member 34. When, however, the axle receives a powerful impact, the checking springs 37 and 38 give sufficiently to permit comparatively free movement of the checking member 34, thus permitting the piston, the checking wings 35 and 36, and the intermediate fluid likewise to move substantially as a unit during the first part of the compression movement of the vehicle spring whereupon the movement of the checking wings 35 and 36 is stopped by the stop shoulder 42, and thereafter further movement of the piston blade 9 can only be permitted by escape of the fluid from the front side of the piston to the rear thereof by means of the by-pass passages 16 and 17. Thus as the vehicle spring approaches the limit of its compression movement, its resistance is powerfully reinforced by the shock absorber until the compression movement ceases. The moment the spring begins its return movement toward the normal expanded position, the piston blade 9, checking member 34 and intermediate fluid again move substantially as a unit in the opposite direction, thereby permitting free action of the spring at the start of its return movement. As the spring on its recoil passes, as it might, beyond its normal position under static load, the movement of the wing 36 of the checking member 34 is first resisted by its checking spring 38, and finally by the stop shoulder 43, so the tendency of the spring on recoil to move an excessive distance beyond its normal position, is checked by the shock absorber mechanism in precisely the same way as the excessive compression movement was checked. It is to be noticed also that excessive movement of the spring in both directions is sufficiently powerfully checked and resisted to quickly return the spring to its normal position ready to receive another impact.

The action of the absorber under excessive expansion of the spring just described obviously illustrates also its action when the wheel drops into a rut or hole instead of meeting with a raised obstruction, so that such movement is effectively controlled and the spring quickly brought back to normal position. It should be here noted that the comparatively limited movement of the checking member 34 enables the shock absorber to "catch up" with the movement of the spring quickly and thus always be in position to control, for it should be observed that the checking member 34 moves independently of the piston blade, so that the moment the reaction comes, the wings 35 and 36 need only travel a comparatively short distance before one or the other is checked by the stop shoulders 42 or 43. From this it follows that the blade 9 need not have returned to or passed its normal position as shown in Fig. 2 before the checking member again begins to operate effectively, but the checking member will be operated according to the distribution of fluid in the chamber 7 on both sides of the piston blade, so that although the piston blade may, for example, have returned but part of its movement toward the normal position, the uneven distribution of the fluid on either side permitted by the by-pass passages 16 and 17 will cause either the wings 35 or 36 to be moved into contact with the stop shoulders 42 or 43 as the case may be before the blade reaches its normal position. This flexibility of the absorber, or its power of automatically adjusting itself to the particular conditions is the thing which makes it effective in quickly restoring the spring to its normal position for the support of the substantially static load. It should be noted also that when either the wing 35 or 36 is so moved as to close either the adjacent port 19 or 20 the piston blade 9 has passed out of range of the port 18 so that the by-pass action either of the passage 16 or 17 is maintained.

Thus it is that an absorber so constructed completely and effectively meets all of the conditions and requirements of an ideal absorber, as set forth in the above statement of invention.

While we have herein described one particular embodiment of the invention, it is to be understood that the same may be altered in details and relative arrangement of parts within the scope of the appended claims.

What we claim is:
1. A shock absorber comprising a member connected with a vehicle body, a second member connected with the axle and movable relatively to the first, a resistance medium adapted to oppose such relative movement, means coöperating with said medium constructed and arranged to offer slight resistance to all compression or expansion movements of the spring under impact and to offer increased resistance proportionate to the force of a heavy impact at the latter part of the compression or expansion movements of the spring under such heavy impact.

2. A shock absorber comprising a member connected with a vehicle body, a second member connected with the axle and movable relatively to the first, a resistance medium adapted to oppose such relative movements, means coöperating with said medium constructed and arranged to cause said medium to offer slight resistance to slight compression or expansion movements of the spring under light impacts and to offer slight initial resistance to compression or expansion movements of the spring under heavy impacts and to offer increased resistance proportionate to the force of heavy impulses at the latter part of such compression or expansion movements of the spring under such heavy impulse.

3. A shock absorber comprising means including members connected respectively to the vehicle body and to the axle of the vehicle constructed and arranged to offer slight proportionate resistance to light impacts on the vehicle spring and means constructed to offer decreased proportionate resistance to heavy impacts during the initial period of movement of the vehicle springs under said heavy impacts and to offer increased resistance to further movement of the spring under such heavy impacts.

4. A shock absorber comprising means including members connected respectively to the vehicle body and to the axle of the vehicle constructed and arranged to offer slight proportionate resistance to light impacts on the vehicle spring and means constructed to offer a decreased proportionate resistance to heavy impacts during the initial period of compression or expansion movements of the vehicle spring under said heavy impacts and means to offer the full resistance of the device during the latter part of the compression or expansion movements of the spring under heavy impact.

5. A shock absorber comprising a member connected with the vehicle body, a second member connected with the axle and movable relatively to the first, a resistance medium adapted to oppose such relative movement, means coöperating with said medium for allowing said movement independent of movement of the resistance medium from one to the opposite side of the piston.

6. A shock absorber comprising a member connected with the vehicle body, a second member connected with the axle and movable relatively to the first, means for allowing free initial movement to the same extent in either direction during compression or expansion of the vehicle spring irrespective of the positions of said spring under different static loads.

7. A shock absorber comprising a cylindrical casing, an arm fixed to said casing and connected with the axle or the body of the vehicle, a piston blade rotatably mounted in said casing, an arm fixed for relative movement with said blade and pivoted to the other of the two parts mentioned of the vehicle, a resistance member rotatably mounted with respect to the axis of said blade and forming a closed chamber within the casing within which the said blade operates, a resistance medium within said chamber adapted to oppose movement of the blade in either direction, means for yieldingly opposing the movement of said resistance member whereby when said blade is moved under compression or expansion of the vehicle spring said movement may be yieldingly checked by said resistance member exerted through said resistance medium and a by-pass communicating with the opposite sides of said blade.

8. A shock absorber comprising a member connected with a vehicle body, a second member connected with the axle and movable relatively to the first, a cylindrical casing rigidly carried by one of said members, a piston blade rotatably mounted in said casing and fixed to the other of said members, a resistance member mounted within said casing and rotatable with respect to the axis of said blade and forming closed chambers upon either side of said blade, yielding means adapted to oppose rotation of said resistance member in either direction and means for positively limiting rotative movement of said resistance member in either direction, a resistance medium within the chambers upon either side of said blade and a by-pass extending between said chambers whereby initial movement of said blade in either direction may be freely permitted and extensive movement thereof may be checked.

9. A shock absorber comprising a member connected to a vehicle body, a second member connected with the axle and movable relatively to the first, a closed cylindrical casing fixed to one of said members, a piston blade rotatably mounted within said casing and fixed relatively to said second member, a resistance member pivotally mounted with respect to said blade and extending diametrically across within said casing to form chambers upon either side of said blade, springs extending between either end of said resistance member and the side of said casing to yieldingly oppose rotative movement of said member in either direction, stop-shoulders upon the inner wall of said casing to limit the movement of said resistance member in either direction, a resistance medium within said chambers on either side of the piston adapted to permit movement of said blade to said resistance member, a by-pass extending between said chambers whereby initial movement of said blade may be freely permitted and extended movement of said blade may be checked by said resistance medium.

In testimony whereof, we the said PAUL J. CUBBISON and ROBERT G. McFARLAND, have hereunto set our hands.

PAUL J. CUBBISON.
ROBERT G. McFARLAND.

Witnesses:
L. P. MAYGART,
B. A. PHILLIPS.